C. M. BIEDMA.
LABORATORY TABLE.
APPLICATION FILED FEB. 25, 1918.
1,314,943.
Patented Sept. 2, 1919.
4 SHEETS—SHEET 1.
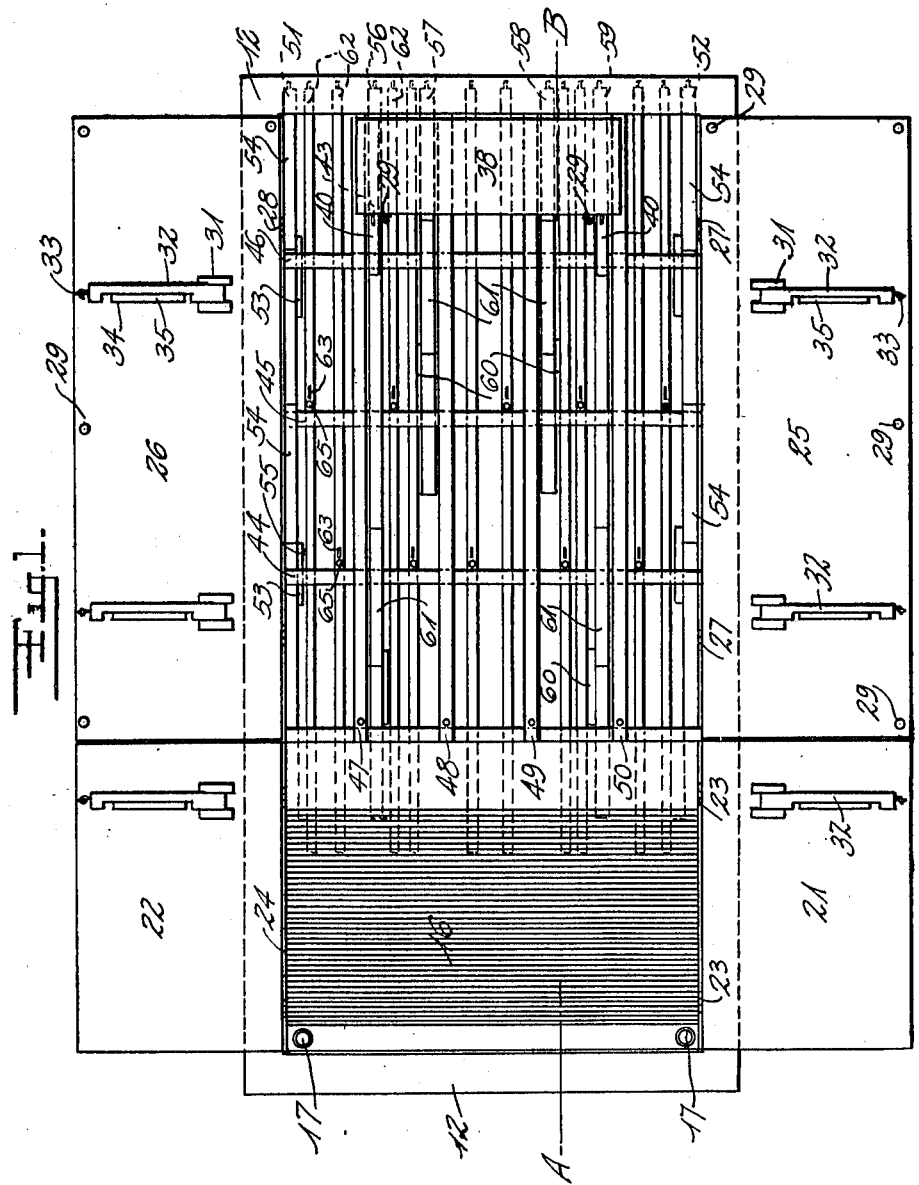
INVENTOR
Carlos M. Biedma
BY
Wm Wallace White
ATTORNEY

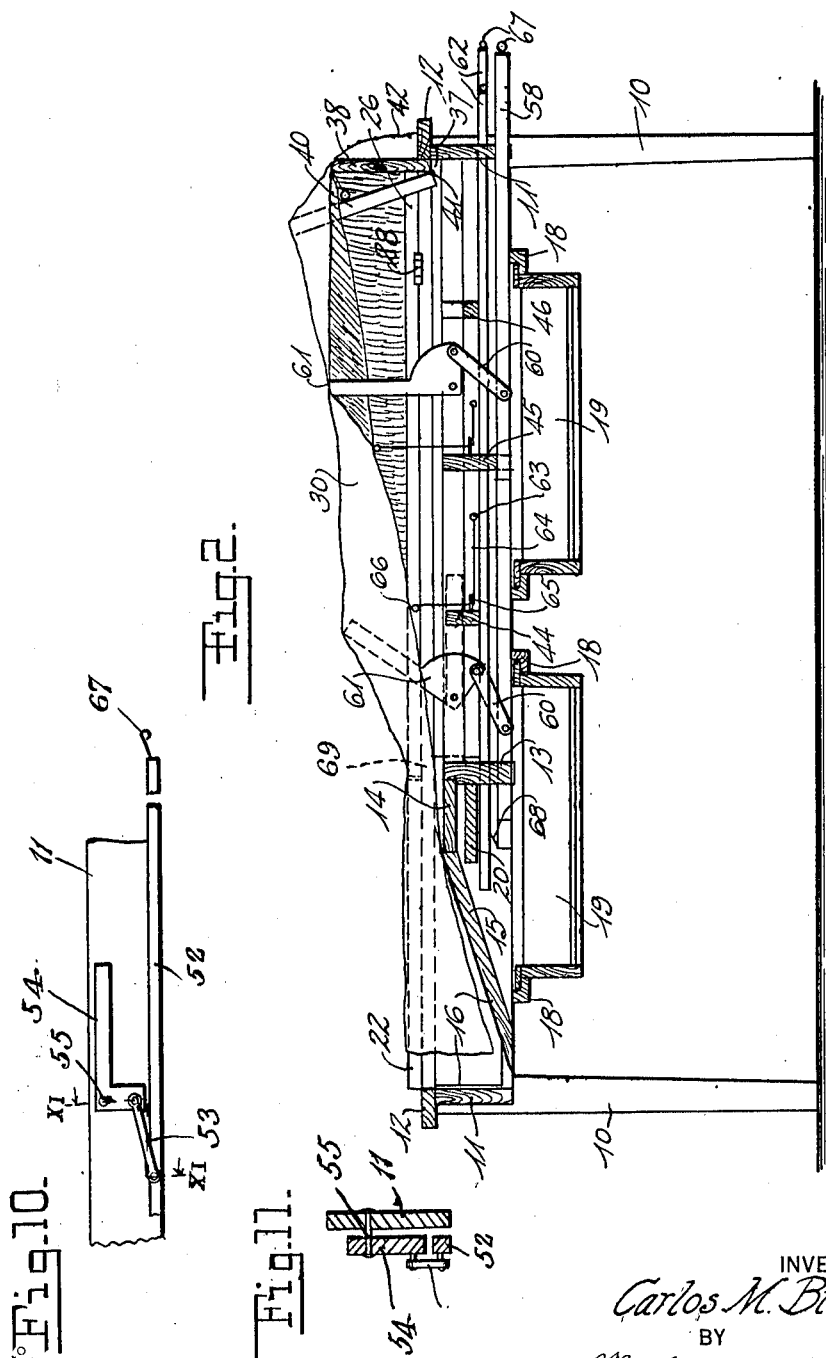

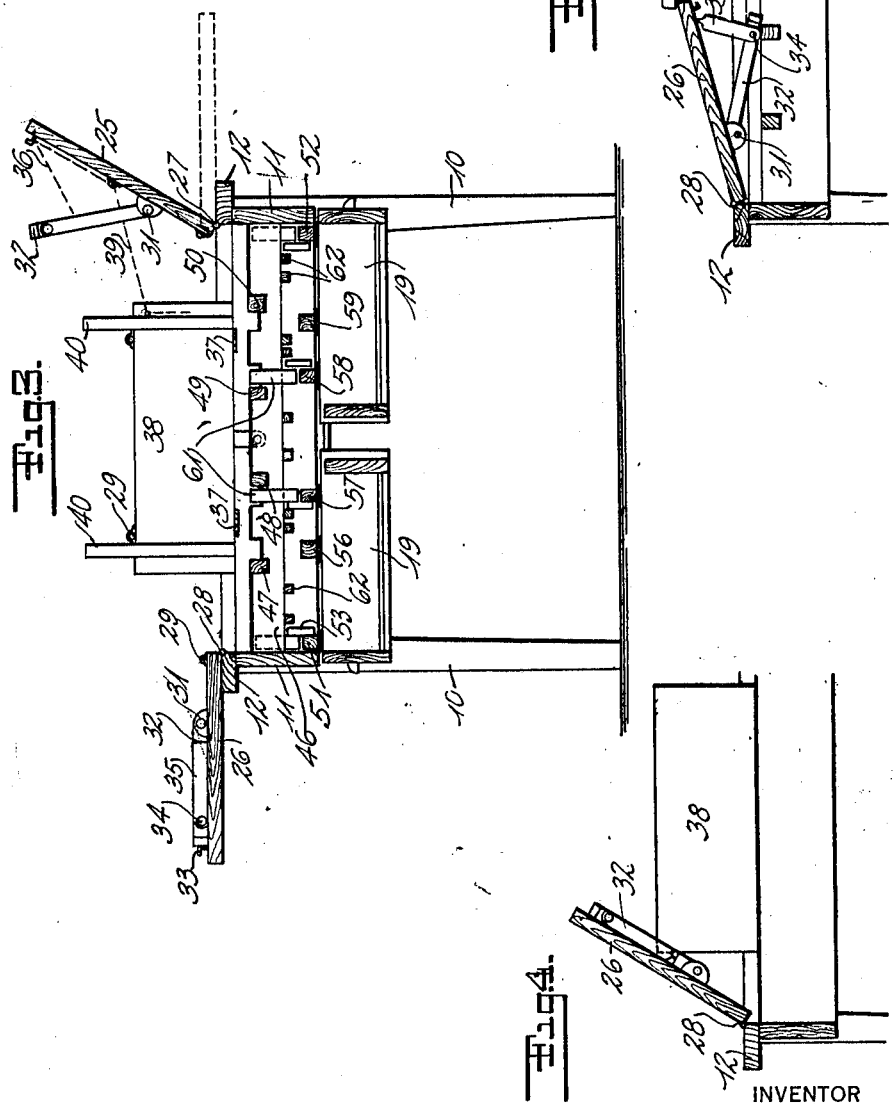

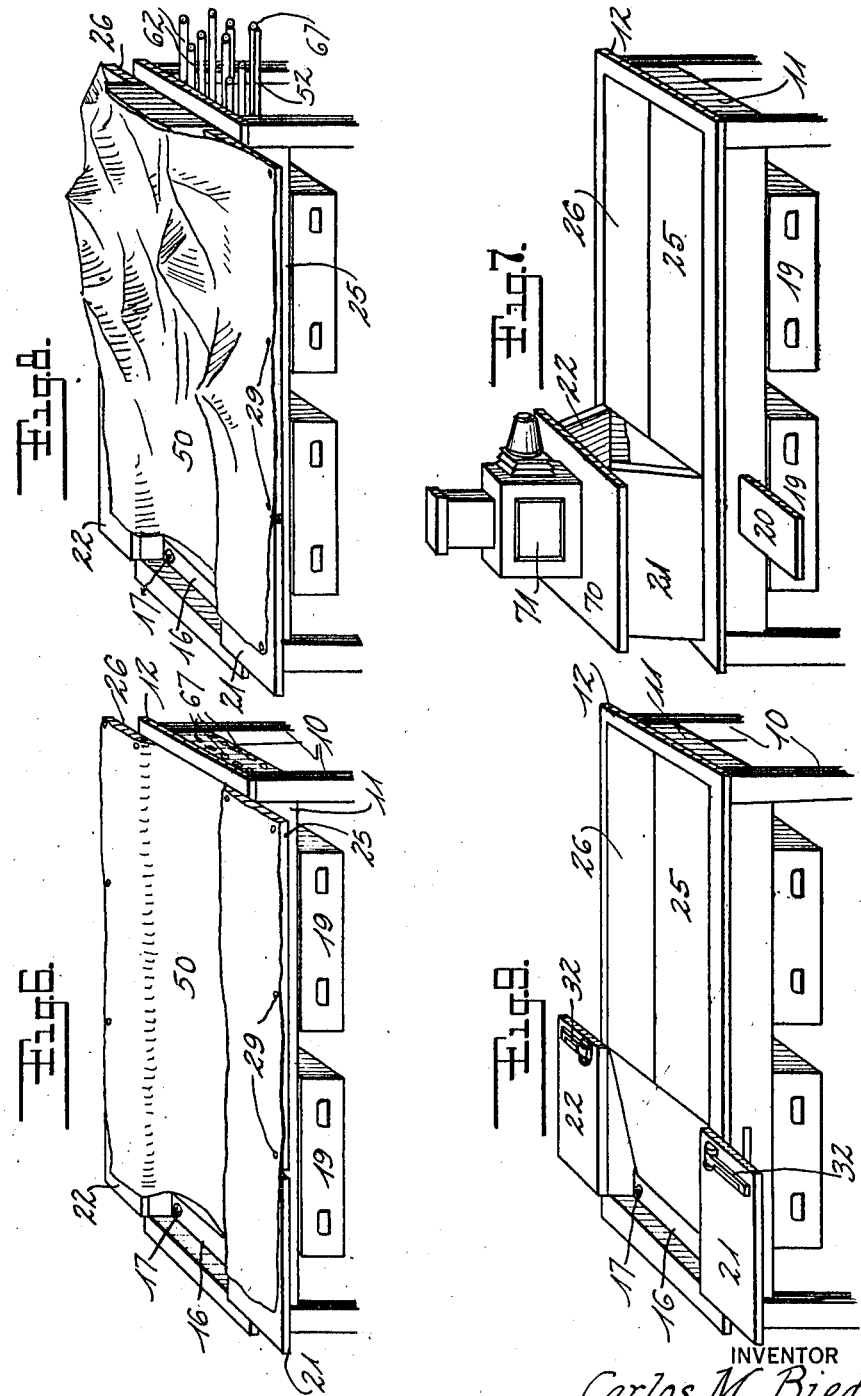

UNITED STATES PATENT OFFICE.

CARLOS M. BIEDMA, OF BUENOS AIRES, ARGENTINA.

LABORATORY-TABLE.

1,314,943.    Specification of Letters Patent.    Patented Sept. 2, 1919.

Application filed February 25, 1918. Serial No. 218,931.

*To all whom it may concern:*

Be it known that I, CARLOS M. BIEDMA, citizen of the Argentine Republic, residing at No. 3310 Santa Fé St., Buenos Aires, Argentina, have invented certain new and useful Improvements in Laboratory-Tables, of which the following is a specification.

This invention relates to an improved laboratory table for teaching purposes and has for its object a table adapted for all normal uses in connection with modern teaching in all branches of human knowledge.

The present invention also has for its object a laboratory table formed by a series of elements and provided with a series of particular devices which permit of adapting the table for different uses, as will be particularly set forth in the course of this specification.

Thus, the laboratory table in accordance with this invention advantageously replaces the patterns generally used in the laboratories designed for physics, being provided with a particular reservoir or trough, most suitable for physical or chemical experiments of any kind, as well as for the cleanness and hygiene of laboratory practice. At the same time, the operations are rendered less dangerous, when considering that the operators generally are novices who just initiate themselves in laboratory practices.

The table in accordance with this invention also comprises folding boards which totally cover the same and which preferably are constructed as blackboards on their outer sides, said covers being divided into four independent boards, as will be explained in the following description. The relative arrangement of the several boards facilitates the variations required for teaching the several matters which on the table are to be exhibited.

Thus, the table in one of its positions, may be used as writing desk, and also as a blackboard and a support for charts, or the like, or it may be used as a laboratory table by simply opening or unfolding two of its upper boards, or by unfolding the remaining boards thereof and placing thereon a waterproof cloth, the table may even be farther extended. Similarly, by means of the said cloth and by operating special lifting and lowering devices, the table is adapted for use in connection with the usual geological representations in schools, where it conveniently replaces the so called sand tables actually used for that purpose, as the waterproof cloth is well suited to give a representation of the rocky crust.

The table in accordance with this invention may also be applied to other purposes, as will be understood from the following description and particularly referred to in the annexed claims; it should also be understood that the table is not limited to the dimensions and exact form of construction herein described, but that any such variation of construction and arrangement of details may be introduced as will fall within the limits of this invention, as clearly set forth in the said claims.

In order that the invention may be readily understood and carried into practice without difficulty, the same has been represented by way of example, in the accompanying drawings which show a preferred form of construction of the table and in which:

Figure 1 is a plan view of the table according to this invention, with the covering boards in an open or unfolded position, so as to show the interior of the same.

Fig. 2 is a sectional view of the table, on the line A—B of Fig. 1, with the parts in a different position.

Fig. 3 is a cross section of the table, the cloth of Fig. 2 being omitted.

Fig. 4 is a similar view in cross section, showing one of the positions which the table may assume in its several uses.

Fig. 5 is a similar view, representing the table with its covers in still another position, as applied to another of its uses.

Fig. 6 illustrates the table in its open or unfolded position and designed for modeling operations or the like.

Fig. 7 is a representation of the table in a particular arrangement, for adapting the same to be used with a projection lantern or for similar purposes.

Fig. 8 is a perspective, illustrating a geological projection, and

Fig. 9 shows the table partially unfolded, for performing physical and chemical experiments.

Fig. 10 is a fragmentary view showing in side elevation the mounting and actuating means for the levers 54.

Fig. 11 is a sectional view taken on the line XI—XI of Fig. 10 and looking in the direction of the arrows.

In all the views, the same numbers and letters of reference indicate like or corresponding parts.

In the form of construction shown, the table consists of four legs 10 which support a rectangular frame formed by vertically arranged wooden boards 11 or the like, on the upper part of which is mounted a similar rectangular frame 12, which forms the upper base or support of the table. At about one third of the length of the table is arranged a horizontal transverse board 14 which together with a vertical transverse board 13 and an inclined board 15,—these latter two provided with an outer lining 16 of sheet iron or other suitable metal—, form a compartment after the manner of a tank or trough, provided with the corresponding outlet holes 17 at its lower edge. Below the table thus formed and suitably guided in wooden guide pieces 18 or the like, are arranged the drawers 19, in suitable number, at each side of the table (in the present case, there are two drawers at each side), said drawers being designed for several uses. In a similar way, at one of the sides of the table and conveniently guided, is a board 20, adapted to slide in an outward direction and when in position corresponds to the lower part of the laboratory tank or trough.

The part corresponding to said laboratory trough, is closed at the upper part of the table by means of the covers 21 and 22, suitably hinged at 23 and 24 to the sides of the table, at their inner edges. On the remaining part of the table are arranged two similar covers 25 and 26, also connected by means of hinges at 27 and 28, respectively, which close the part of the table in which are mounted the operating devices for the same, hereinafter to be described. At the edges of the aforesaid covers are secured the studs 29, for fixing the borders of the waterproof cloth 30, whose object will be explained later. Each of the covers carries at a point close to its axis of rotation, suitable bearings 31 of wood or other material in which are pivoted rods 32. Near the upper end of the rods 32 is jointed at 34 a second rod 35, for a purpose to be explained afterward. The rods 32 are connected near their upper ends to the end of a chain 36 which by passing over a hook 33 provided at the outer edge of the cover, allows of adjusting the angle of said rods in relation to the inner surface of the covers of the table.

At one end of the table is hinged at 37 a board 38 by means of which the covers 25 and 26 may be maintained in an open position, to such an extent as may be desired. Chains 39, connected to the board 38 and to the covers 25 and 26, serve to adjust at the desired moment the open position of the cover. On the lower side of the aforementioned board 38 adjacent the opposite ends thereof are mounted wooden battens 40, pivoted on hinges 41 and whose angle of inclination is adjusted by means of chains 42, one of the ends of each of which is affixed to its respective batten and after passing over a sheave 43 placed at the upper part of the board 38, is connected at its other end to the outer side of the table.

Arranged at regular spaced intervals within the frame 11 and extending transversely of the same are cross bars 44, 45, and 46, while similarly arranged and extending longitudinally of the frame are bolsters 47, 48, 49, and 50. As shown in Fig. 3, the cross bars 44, 45, and 46 are provided upon their upper edges with series of alined recesses which are adapted to slidably receive the bolsters 47, 48, 49, and 50.

Disposed adjacent each side of the frame 11 and extending longitudinally of the same are operating rods 51 and 52, such rods normally protruding beyond one end of the table as shown in Fig. 1 to allow the manipulation thereof. Pivoted to each rod 51 and 52 at suitable points within their lengths is the lower end of a link 53, the upper end of which is pivoted to the end of a crank lever 54, as shown in Figs. 10 and 11. Each lever 54 is pivoted at 55 to the adjacent bolster, wherefore it will be seen that when the bolster is pulled outwardly from the table, the lever will be raised, and conversely lowered to horizontal position when the bolster is retracted. 56, 57, 58, and 59 designate other operating rods arranged between and parallel to the rods 51 and 52. These rods 56, 57, etc., are provided with links 60 and brackets 61, as shown in Fig. 2, and when the waterproof cloth 30 covers the table, as shown in Fig. 8, by withdrawing the operating rods from the table, the cloth is made to rise at predetermined points and at predetermined heights so as to graphically represent geological and other terrestrial phenomena.

A series of intermediate rods or battens 62, etc., are provided with hooks 63, with which is engaged one of the ends of a rope or similar device 64 which passes through the perforated sleeve 65, secured to the cross bars 44, etc., of the table and the other end of which is secured to rings 66, conveniently secured to the lower side of the cloth 30. The brackets 61 have for object to raise the cloth 30 and thereby produce the several protuberances, while the ropes 64 are designed to cause the depressions. By means of this arrangement, it will be seen that after definitely opening the covers and placing them, by means of the devices previously described in the desired positions, the cloth 30 is secured in place, as shown in Fig. 8.

Now by pulling the operating rods from the end of the table, the brackets and ropes heretofore described are actuated to produce the desired protuberances and depressions in the cloth 30. Suitable handles 67 are provided on the protruding ends of the operating rods to facilitate the operation thereof.

The rods 56, 57, etc., carry hooks at their inner ends to each of which is connected one end of cord 68 which passes over a guide secured to the lower edge of the cross board 14. The other end of the cord 68 is secured at 69 to the underside of the cloth 30. When moving the operating rods outwardly to elevate portions of the cloth, the cloth is loosened by virtue of the cords 68, so that when returning the rods to normal position, secondary depressions are formed in the cloth, as will be readily seen from the foregoing description.

The particular devices just described, are particularly employed when the table is to be used for geological demonstrations, as shown in Fig. 8; the table will thus conveniently replace the so called sand tables, because of the advantage of having a waterproof bottom which graphically constitutes the rocky crust of the earth and which can fold, rise and collapse, etc., by means of the said operating rods, and thus producing in an extremely easy and simple manner, a true reproduction of all natural phenomena past and present, of the dominion of geology and geography, respectively.

The present system also facilitates modeling work when representing the action of the movable elements of the soil, such as sand, gravel, etc., carried about and worked on by erosion, wind, rain, snow and running water generally, all of which may be obtained owing to the dimensions of this table and which could not be shown by the use of the said sand tables.

In Fig. 7 a further manner of using the table in accordance with this invention has been represented. According thereto, the rods 32 carried by the covers 21 and 22 are opened and these covers are maintained supported at an angle of about 60 degrees in relation to the vertical. On the upper edges of the covers 21 and 22 is placed an auxiliary board 70 which is supported in a horizontal position and serves to support a projection lantern, such as indicated at 71, while the remainder of the table will furnish an ample surface for supporting the boxes, fittings, etc., to be used in connection with the lantern.

In the arrangement shown in Fig. 9, the parts are approximately in the same positions as in Fig. 7, except that the two covers 21 and 22 are totally unfolded or opened, thereby uncovering the interior of the tank or trough designed for physical and chemical laboratory operations.

In Fig. 6 a variation of the foregoing arrangement is shown in which all of the covers are entirely unfolded, and the waterproof cloth 50 spread over the same, with its lateral edges secured to the studs 29. Thus, a much larger operating surface is produced which may be used for physical and chemical operations, as well as for school modeling and cardboard work, all of which may be performed with much cleanliness on account of the particular conditions of the table and the advantage of the tank or trough therein provided.

As previously stated, the outer or upper surfaces of the covers of the table are constructed as a blackboard, so that when the table is in its closed position, it will offer a perfectly plain blackboard surface of suitable dimensions for drawing charts thereon, writing dictations, etc.

In Fig. 5, a cross section of another of the positions to be assumed by the table in accordance with this invention is shown, in connection with another of its uses. In this position, all the boards of the same are opened or unfolded, the battens or rods 32 being caused to rest on the central bolsters and the jointed rods 35 are opened so that they may serve to support the central part of the covers. In this manner, the covers will be raised at the central part of the table and remain separated, which allows of the introduction into the space thus formed of special inkstands 72, whereby the table will be converted into a most convenient writing-desk having two sides to accommodate two or more students.

In the position represented in Fig. 4, one or both covers 25 or 26 are opened to an angle of about 60 degrees to the vertical, whereupon the board 38 is opened or unfolded. In this position, the table can be used, by means of the two blackboards which remain at its sides, for drawing, writing or other purposes, or as supported for the boards or models to be used for teaching.

The table in accordance with the present invention may of course also be applied to other uses which will readily occur to the persons acquainted with the practices of teaching. It will be evident that the invention neither depends upon the size nor upon the materials used for its construction, being only restricted as to its general structure to the essential features set forth in the claims annexed hereto.

I now declare that what I claim as new and desire to secure by Letters Patent, is:

1. In combination, a support, a flexible sheet of material covering the support, and means for forming protuberances and depressions in the sheet of material, comprising movable members, and members slidable without rotation for actuating the movable members.

2. In combination, a support, a flexible sheet of material covering the support, pivoted means for forming protuberances in the cloth, and flexible means for forming depressions in the cloth.

3. In combination, a support, a flexible sheet of material covering the support, pivoted means for forming protuberances in the cloth, and flexible means for forming depressions in the cloth, both of said means being adjustable.

4. In combination, a support, a flexible sheet of material covering the support, pivoted means for forming protuberances in the cloth, flexible means for forming depressions in the cloth, and slidable means for actuating both of said means.

5. In combination, a table, a flexible sheet of material covering the table, means for forming protuberances in the material, comprising members pivotally mounted for vertical movement to engage the under side of the material, means for forming depressions in the material, comprising flexible members secured to the under side of the sheet of material, and means mounted for reciprocating movements for actuating said members.

6. In combination, a table, hinged covers on the table, a flexible sheet of material connected to the covers and adapted to span the table when the covers are opened, means foldable beneath the covers for forming protuberances and depressions in the sheet of material, and means slidable in the table for actuating said means.

7. In combination, a support, a flexible sheet of material covering the support, means for forming protuberances and depressions in the sheet of material, comprising movable members and sliding members for actuating the movable members, and means for adjusting the last means for varying the height and depth of the protuberances and depressions respectively.

8. In combination, a table, hinged covers on the table, a flexible sheet of material connected to the covers and adapted to span the table when the covers are opened, and means foldable beneath the covers for forming protuberances and depressions in the sheet of material.

9. A table comprising a frame, a trough at one end of the frame, mechanism occupying the remainder of the frame for forming protuberances and depressions in a flexible sheet of material which is adapted to be arranged on the table, and hinged covers for covering the trough and mechanism.

10. A table comprising a frame, a trough at one end of the frame, mechanism occupying the remainder of the frame for forming protuberances and depressions in a flexible sheet of material when arranged on the table, hinged covers for the trough, and hinged covers for the mechanism.

11. In combination, a table comprising a frame, bars extending transversely of the frame and formed with recesses, operating rods slidable in said recesses, a flexible sheet of material spanning the frame, and means operatively connecting the sheet of material with said operating rods for forming protuberances and depressions in the sheet of material upon the actuation of said rods.

In testimony whereof I affix my signature in the presence of two witnesses.

CARLOS M. BIEDMA.

Witnesses:
E. B. COREY,
RENA G. MOKETTE.

Copies of this patent may be obtained for five cents each, by addressing the "Commissioner of Patents, Washington, D. C."